United States Patent
Wang et al.

(10) Patent No.: US 9,510,198 B2
(45) Date of Patent: Nov. 29, 2016

(54) MOBILE TERMINAL AND USER IDENTITY RECOGNITION METHOD

(75) Inventors: Keping Wang, Shenzhen (CN); Zhonghui Che, Shenzhen (CN); Guanjun Tan, Shenzhen (CN); Xin Song, Shenzhen (CN); Leshen Hu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/365,241

(22) PCT Filed: Jun. 25, 2012

(86) PCT No.: PCT/CN2012/077470
§ 371 (c)(1),
(2), (4) Date: Jul. 16, 2014

(87) PCT Pub. No.: WO2013/086845
PCT Pub. Date: Jun. 20, 2013

(65) Prior Publication Data
US 2014/0323081 A1    Oct. 30, 2014

(30) Foreign Application Priority Data
Dec. 15, 2011    (CN) .......................... 2011 1 0420829

(51) Int. Cl.
*H04W 12/00* (2009.01)
*H04M 15/00* (2006.01)
(Continued)

(52) U.S. Cl.
CPC ............. *H04W 12/06* (2013.01); *H04M 15/47* (2013.01); *H04W 12/12* (2013.01); *H04L 63/1425* (2013.01)

(58) Field of Classification Search
CPC  H04W 12/06; H04W 12/12; H04L 63/1425; H04M 15/47; C08F 220/56; C08G 2261/124; C08G 2261/1412; C08G 2261/147; C08G 2261/3142; C08G 2261/3162; C08G 2261/3241; C08G 2261/3246; C08G 2261/411
USPC ......... 455/26.1, 405, 410–411, 432.3, 456.3, 455/558; 726/35
See application file for complete search history.

(56) References Cited

U.S. PATENT DOCUMENTS

2005/0197103 A1* 9/2005 Inoue ........................... 455/411
2006/0009214 A1* 1/2006 Cardina et al. ............ 455/432.3
(Continued)

FOREIGN PATENT DOCUMENTS

| CN | 101141721 A | 3/2008 |
|---|---|---|
| CN | 101496427 A | 7/2009 |

(Continued)

OTHER PUBLICATIONS

International Search Report in international application No. PCT/CN2012/077470, mailed on Oct. 4, 2012.
(Continued)

*Primary Examiner* — Nathan Taylor
(74) *Attorney, Agent, or Firm* — Oppedahl Patent Law Firm LLC (57) ABSTRACT

A user identity recognition method for a mobile terminal includes that: a mobile terminal detects and tracks a user's behavior before a Subscriber Identity Module (SIM) card is replaced, and records characteristics of the user's behavior; after the SIM card is replaced, the mobile terminal detects and tracks a user's behavior and records characteristics of the user's behavior; the mobile terminals determines whether the characteristics of the user's behavior before the SIM card is replaced are same as or similar to the characteristics of the user's behavior after the SIM card is replaced; if so, the mobile terminals determines that the user is a legal user; otherwise, the mobile terminals determines that the user is an illegal user. Correspondingly, a mobile terminal is also disclosed, which is difficult to crack, more secure, and easy and convenient to implement.

4 Claims, 7 Drawing Sheets

(51) Int. Cl.
*H04W 12/06* (2009.01)
*H04W 12/12* (2009.01)
*H04L 29/06* (2006.01)

(56) References Cited

U.S. PATENT DOCUMENTS

| | | | |
|---|---|---|---|
| 2006/0025177 A1* | 2/2006 | Tu | 455/558 |
| 2008/0070631 A1* | 3/2008 | Kumar | 455/558 |
| 2009/0249460 A1 | 10/2009 | Fitzgerald | |
| 2009/0249497 A1* | 10/2009 | Fitzgerald et al. | 726/35 |
| 2010/0130233 A1* | 5/2010 | Parker | 455/456.3 |
| 2010/0146622 A1* | 6/2010 | Nordstrom et al. | 726/23 |
| 2010/0317320 A1* | 12/2010 | Sakargayan | 455/410 |
| 2013/0303112 A1* | 11/2013 | Chhipa | 455/405 |

FOREIGN PATENT DOCUMENTS

| | | |
|---|---|---|
| CN | 201374818 Y | 12/2009 |
| CN | 101917662 A | 12/2010 |
| CN | 102104679 A | 6/2011 |
| JP | 2004064657 A | 2/2004 |
| JP | 2006352561 A | 12/2006 |
| JP | 2009518878 A | 5/2009 |
| JP | 2009171160 A | 7/2009 |

OTHER PUBLICATIONS

English Translation of the Written Opinion of the International Search Authority in international application No. PCT/CN2012/077470, mailed on Oct. 4, 2012.

Implicit Authentication for Mobile Devices, mailed on Aug. 11, 2009.

Authentication of Mobile Devices from User Behavior, mailed on Jun. 21, 2010.

Supplementary European Search Report in European application No. 12857779.8, mailed on Apr. 17, 2015.

* cited by examiner

MOBILE TERMINAL AND USER IDENTITY RECOGNITION METHOD

TECHNICAL FIELD

The disclosure relates to the field of communication technologies, and more particularly to a mobile terminal and a user identity recognition method.

BACKGROUND

The number of all mobile users around the world has broken through 5 billion by Jul. 10, 2010, while the number of 3G users exceeds 500 million.

The number of all mobile users around the world is merely about 720 millions by 2000, which is less than the current number of Chinese mobile users. The number of mobile broadband users, which is also growing rapidly, is predicted to exceed 3.4 billion (the number is merely 360 million by 2009) by 2015. Researches show that 80% of Internet users will surf the Internet using their mobile devices in the near future.

Accessing the Internet with the mobile device only means convenience for some users, but for some other users, is a necessary lifestyle. By accessing the Internet with the mobile device, a user who cannot go to a bank personally or deposit/draw money using a bank account can transfer accounts easily, fishermen and farmers can acquire a latest message on weather forecast, rural residents can locally obtain medical care services, and students can accept education online. Besides, the access of the Internet with the mobile device can promote the daily operation of a small enterprise and promote economical development. In a more mature market, the growth of network traffic is promoted by interconnected devices instead of increasing the number of users. The researches made by the Ericsson show that the number of global interconnected devices will reach 50 billion by 2020.

With the continuous growth in the number of mobile terminal users, the information security of the mobile terminal becomes especially important. Thus, it is necessary to authenticate the identity of a user of the mobile terminal including a mobile phone in order to guarantee the information security of individual users.

Currently used user identity authentication methods, which also include a point-connected pattern authentication and other advanced fingerprint recognition technologies in addition to the main character password authentication, commonly require the user to manually store a password in advance, and then collect input data in authenticating the identity of a user and sequentially compare the collected input data with the stored password to determine the identity of the user. Besides low in password storage security, such conventional check mode easily leads to the leakage of confidential information, and such conventional check mode in which manual intervention is required, is not automatic and intelligent.

Some technologies involve widely used first-generation biological recognition technologies, including fingerprint recognition, voice recognition, hand shape recognition and iris recognition, most of which need the cooperation of a monitored target and sometimes even need the monitored target to complete a necessary action to contact a body part with a recognition device to achieve identity recognition. These cumbersome recognition actions lead to a low recognition speed, cause inconvenience in the use of the recognition device and make the recognition device undesirable.

The first-generation identity recognition technologies face anti-counterfeit and anti-theft challenges as criminal means becomes more and more intelligent and technological. Researches show that an artificial finger made from gelatin can successfully cheat a fingerprint recognition system easily, and false iris characteristics etched on contact lens may also confuse an iris recognition system.

SUMMARY

The disclosure provides a mobile terminal and a user identity recognition method to track and record behaviors of a terminal user, so as to recognize legal or illegal identity of the terminal user.

The disclosure provides a user identity recognition method for a mobile terminal, which includes that:

a mobile terminal detects and tracks a user's behavior before a Subscriber Identity Module (SIM) card is replaced, and records characteristics of the user's behavior;

after the SIM card is replaced, the mobile terminal detects and tracks a user's behavior and records characteristics of the user's behavior; and the mobile terminal determines whether the characteristics of the user's behavior before the SIM card is replaced are same as or similar to the characteristics of the user's behavior after the SIM card is replaced; when the characteristics of the user's behavior before the SIM card is replaced are same as or similar to the characteristics of the user's behavior after the SIM card is replaced, the mobile terminal determines that the user is a legal user; and when the characteristics of the user's behavior before the SIM card is replaced are not same as or similar to the characteristics of the user's behavior after the SIM card is replaced, the mobile terminal determines that the user is an illegal user.

In the above solution, the user's behavior may be a movement behavior or an operation behavior.

In the above solution, user's behavior characteristics of the movement behavior may include home position information, company position information, home-company distance information, information of the user's commute time slot, and information of the user's commuting time to work.

In the above solution, the operation behavior may be one of the followings: a voice operation, an Internet access operation, a short messaging service operation, a telephone book operation, an SIM Card Tool Kit (STK) operation, a game operation, a player operation, a camera operation, an electronic reading operation and a charging operation.

In the above solution, when the operation behavior may be the voice operation, characteristics corresponding to the user's behavior comprise an operation type, a number type, time slot and duration;

when the operation behavior may be the short messaging service operation, characteristics corresponding to the user's behavior comprise an operation type, a number type and time slot;

when the operation behavior may be the Internet access operation, characteristics corresponding to the user's behavior comprise an access mode, time slot, online behavior and duration;

when the operation behavior may be the telephone book operation, characteristics corresponding to the user's behavior comprise an operation type, a number type and time slot;

when the operation behavior may be the STK operation, characteristics corresponding to the user's behavior comprise an operation type and time slot;

when the operation behavior may be the game operation, characteristics corresponding to the user's behavior comprise an operation type, time slot and duration;

when the operation behavior may be the player operation, characteristics corresponding to the user's behavior comprise an operation type, a multimedia type, time slot and duration;

when the operation behavior may be the camera operation, characteristics corresponding to the user's behavior comprise an operation type, time slot and duration;

when the operation behavior may be the electronic reading operation, characteristics corresponding to the user's behavior comprise an operation type, time slot and duration; and when the operation behavior may be the charging operation, characteristics corresponding to the user's behavior comprise an operation type, time slot and duration.

The disclosure also provides a mobile terminal, which includes: a behavior detecting and tracking module, a behavior characteristic extraction module, a behavior characteristic comparison module and a determination module, wherein the behavior detecting and tracking module is configured to detect and track a user's behavior before and after an SIM card is replaced, to provide data for extraction of behavior characteristics;

the behavior characteristic extraction module is configured to extract characteristics of the user's behavior before and after the SIM card is replaced;

the user characteristic comparison module is configured to compare the characteristics of the user's behavior before the SIM card is replaced with the characteristics of the user's behavior after the SIM card is replaced; and the determination module is configured to determine, according to the comparison result transmitted from the user characteristic comparison module, whether the user is a legal user, when the characteristics of the user's behavior before the SIM card is replaced are same as or similar to the characteristics of the user's behavior after the SIM card is replaced, determine that the user is a legal user, and when the characteristics of the user's behavior before the SIM card is replaced are not same as or similar to the characteristics of the user's behavior after the SIM card is replaced, determine that the user is an illegal user.

In the above solution, the user's behavior may be a movement behavior or an operation behavior.

In the above solution, user's behavior characteristics of the movement behavior may include home position information, company position information, home-company distance information, information of the user's commute time slot, and information of the user's commuting time to work.

In the above solution, the operation behavior may be one of the followings: a voice operation, an Internet access operation, a short messaging service operation, a telephone book operation, an STK operation, a game operation, a player operation, a camera operation, an electronic reading operation and a charging operation.

In the above solution, when the operation behavior may be the voice operation, characteristics corresponding to the user's behavior comprise an operation type, a number type, time slot and duration;

when the operation behavior may be the short messaging service operation, characteristics corresponding to the user's behavior comprise an operation type, a number type and time slot;

when the operation behavior may be the Internet access operation, characteristics corresponding to the user's behavior comprise an access mode, time slot, online behavior and duration;

when the operation behavior may be the telephone book operation, characteristics corresponding to the user's behavior comprise an operation type, a number type and time slot;

when the operation behavior may be the STK operation, characteristics corresponding to the user's behavior comprise an operation type and time slot;

when the operation behavior may be the game operation, characteristics corresponding to the user's behavior comprise an operation type, time slot and duration;

when the operation behavior may be the player operation, characteristics corresponding to the user's behavior comprise an operation type, a multimedia type, time slot and duration;

when the operation behavior may be the camera operation, characteristics corresponding to the user's behavior comprise an operation type, time slot and duration;

when the operation behavior may be the electronic reading operation, characteristics corresponding to the user's behavior comprise an operation type, time slot and duration; and when the operation behavior may be the charging operation, characteristics corresponding to the user's behavior comprise an operation type, time slot and duration.

To sum up, the disclosure has the following beneficial effects:

in the technical solution of the disclosure, a user behaviour is utilized to identity recognition and is applied to a mobile terminal, since habits of a user are taken as identity characteristics of the user, the technical solution of the disclosure is difficult to simulate and crack, free of secret key storage and issuing, and safer. Additionally, even if a legal user inserts a new SIM card after an old SIM card is lost, it will not affect the use of the mobile terminal as living habits of the user are not changed. Rather, the mobile terminal unsuccessfully authenticates the identity of an illegal user who inserts a new SIM card into the mobile terminal, thus guarantying the rights and interests of the legal user. Instead of requiring a password presetting operation from an operator or manufacturer, the mobile terminal disclosed herein collects behavior characteristics unknowingly when being used, and is therefore easy and convenient in implementation.

DETAILED DESCRIPTION

A technical solution of the disclosure provides a method and a terminal for recognizing legal or illegal identity of a terminal user by tracking and recording behaviors of the terminal user.

A user recognition method disclosed herein may include the following steps:

a training phase: characteristic extraction.

The characteristic extraction phase is mainly implemented by detecting and tracking behaviors of a user.

After powering on a terminal, the user carrying the terminal moves, for example, the user goes to work in the morning, spends most of the day working in the company, has dinner at a restaurant in the evening, sleeps at home at night, and goes to work in the second morning. The continuous movement of the user from home to company and then from company to home constitutes a ring. The daily movement behavior of the user may be counted every day by taking the period starting from the leave of the user from home to the return of the user to home as a cycle, the characteristic attributes of the daily movement behavior are collected and statistically analyzed in several cycles, then the movement behavior habit of the user can be obtained to obtain movement behavior characteristics representing the identity of the user. For example, the movement behavior characteristics include home position information, company position information, and dynamic characteristic information such as 'go to work' and 'come back home from work', with which the behavior characteristics of a terminal user may be represented to form a one-to-one correspondence relationship between the user and the terminal.

After initially inserting an SIM card into a terminal and powering on the terminal, the user operates functional modules in the terminal, such as voice, Internet, short messaging service, telephone book, STK, game, player, camera, electronic reading and charging modules. In this way, the user operates another function after operating the current operation for a period of time. It is assumed that the period from the moment the terminal is powered on to the moment the power of the terminal is running out as a cycle in which some functions are executed more than once, the repeated use of the functions makes it undesirable to record the state transition diagram of the functions but makes it possible to count up the operation behavior of the user on each function, the characteristic attributes of the operation behavior of the user may be collected and statically analyzed in several cycles to obtain the operation behavior habit of the user, thus obtaining operation behavior characteristics representing the identity of the user.

Behavior Characteristic Extraction:

Movement behavior characteristics: a first-level determination characteristic is extracted from the above data records, that is, home position information and company position information of the user is statistically analyzed, that is, two position points where the user stays averagely for the longest time, and characteristics of the two point positions are taken as a first-level characteristic vector, with which the identity characteristics of the user can be roughly recorded.

To obtain the identity characteristics of the user precisely, dynamic characteristics of certain dynamic characteristic information 'go to work' and 'come back home from work' are compared precisely as two-level characteristics. Personal habits, such as time slot of occurrence, a distance length, consumed time, a speed, key past positions and other information parameters, may be accurately represented with the dynamic parameters. By averaging the values and combining the characteristic values into a vector, two dynamic characteristic value vectors: 'go to work' and 'come home', may be obtained. For identity characteristics of the user, two precisely described characteristic vectors may be obtained.

Operation behavior characteristics: a first-level determination characteristic is extracted first from the above data records, that is, a function used by a user most frequently, namely, a function averagely used once or more in each cycle, is statically analyzed. Then, a binary number having the same number of digits as a frequently-used function number may be designed, each digit of the binary number representing a frequently-used function, wherein a digit '1' presents the use of a frequently used function. In this way, user characteristics may be roughly recorded with the first-level binary characteristic number.

To obtain user identity characteristics accurately, functions which are not used frequently are omitted. Each frequently-used function is considered as a category, characteristic values of data of each category may be collected according to characteristic attributes of the data of the category, and the characteristic values form a vector, thereby obtaining characteristic value vectors of the functions frequently used in several cycles.

Recognition Phase:

When the user uses the terminal for the first time, the International Mobile Subscribe Identity (IMSI) number and the telephone number of the user are recorded so that the terminal can determine the replacement of an SIM card when an SIM card is changed by a legal or illegal user, and the identity of the operator needs to be recognized when the SIM card is changed.

By tracking and recording daily behaviors of the operator, identity authentication is implemented through the following two steps:

the collected first-level characteristic values are compared, and if the positions are near, then it is indicated that the first-level determination passes and that the user is a legal user, and the following determination is then carried out. If the positions are not near, it is determined that the user is as an illegal user, and no further determination is carried out.

Dynamic sample vectors of the operator are collected, a similarity is determined by a nearest neighbor method, and the similarity of the two vectors is determined by comparing the Euclidean distance between the two vectors. A maximum threshold may be obtained through an initial design and training, that is, the function use behavior of the current user is consistent with that of a legal user if the Euclidean distance between the two vectors is within the maximum distance, in this way, the identity of the user can be determined by precisely determining the frequently used functions. If the identity of the user is legal, then the user can use the terminal normally without being provided with a prompt.

If an operator is determined as an illegal user, to guarantee the personal information security of the legal user, a short messaging service message is first sent to the telephone number of the legal user recorded on the terminal to inform the legal user of the telephone number of the current illegal user, and various former information stored in the terminal is deleted. The terminal cannot be started unless the SIM card is replaced. The terminal cannot be used normally unless the user passes the identity recognition which is carried out after the card is replaced.

The technical solution is further elaborated below in combination with the drawings and specific embodiments.

Figure 1:
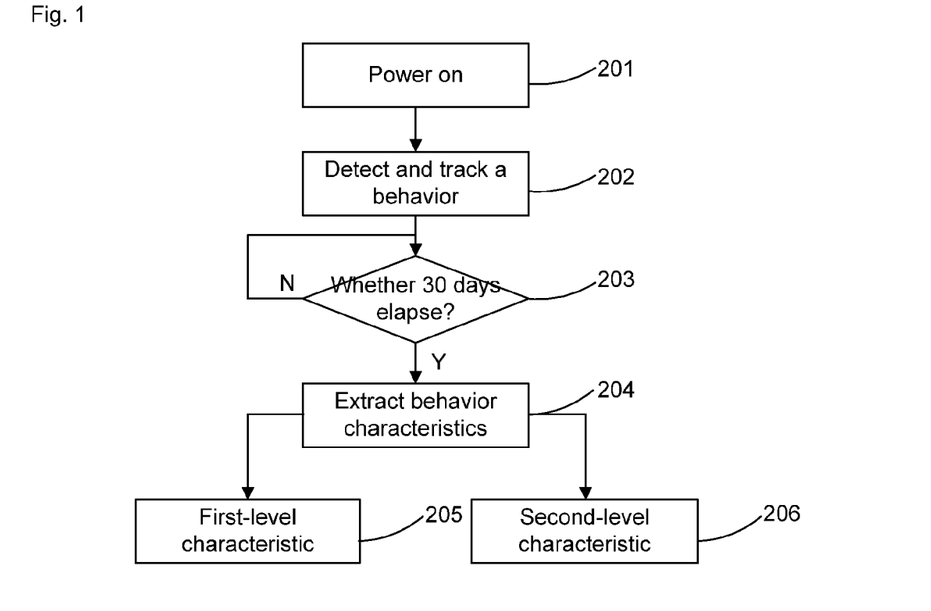
FIG. 1 illustrates a user's behavior recognition mode according to an embodiment of the disclosure.

As shown in FIG. 1, in a user's behavior recognition mode provided in an embodiment of the disclosure, a behavior 'go to work' has the following four attributes: time slot (e.g., morning, noon, afternoon, evening and late at night), a distance length, duration and key past point position information. Each attribute is digitally coded according to a set of values of the attribute, for example, five values of the attribute 'duration' may be represented by set codes 1, 2, 3, 4 and 5. Since one day has 24 hours, the time slot may be divided into: morning: 8:00-12:00, noon: 12:00-14:00, afternoon: 14:00-18:00, evening: 18:00-23:00; and late at night: 23:00-8:00 of next morning, which is conformity with living habits of a person. The distance length is directly replaced by a number in 10 meters, and the duration is timed with a real number in minutes. To record the habit characteristics of the behavior 'go to work' of a user better, opposition information of two or three key points are collected again. In this way, a behavior may be recorded with a string of digital codes, for example, going to work in the morning taking 30 minutes, passing municipal government and South Third Ring, and the total distance being 20 km. Then, this behavior may be represented with a coded vector (1, 2000, 30, location 1, location 2).

A behavior 'come back home from work' may also be represented in the way described above.

Figure 2:
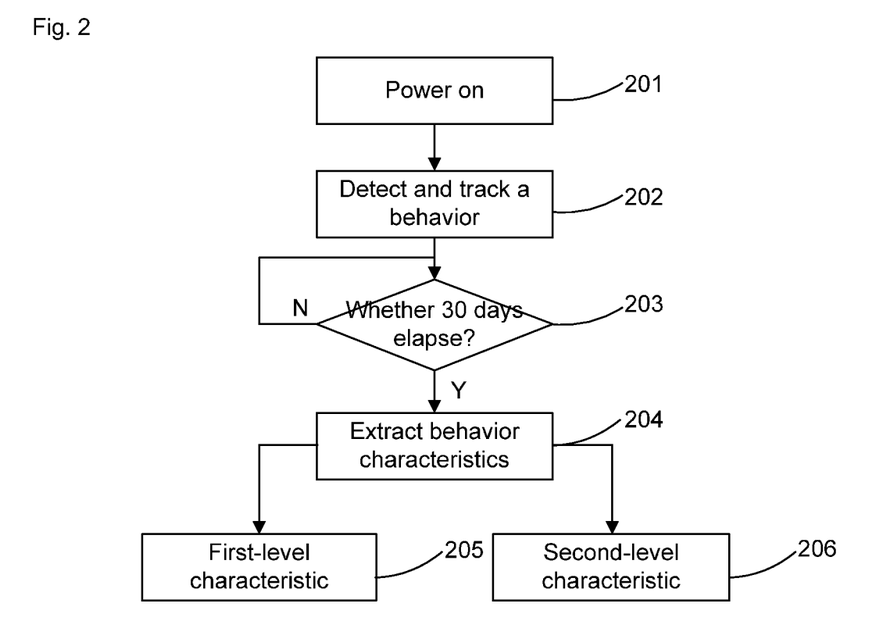
FIG. 2 illustrates a user characteristic training extraction mode according to an embodiment of the disclosure.

As shown in FIG. 2, according to a user characteristic training extraction mode provided in an embodiment of the disclosure, user identity characteristics are extracted through the following steps:

Step 201: After a terminal is powered on, a behavior detecting and tracking module starts running, and records the IMSI of the SIM card initially inserted into the terminal.

Step 202: A behavior is detected and tracked.

The time a user stays at each position is recorded by using a GPS or base station positioning system.

Step 203: It is determined whether the record is made for 30 times. If the record is made for 30 times, Step 204 is executed. If the record is not made for 30 times, the determination continues to be performed.

To collect the movement behavior habit of the user, each day elapsing after the terminal is powered on is defined as a cycle, and it is determined whether the cycle circulates for 30 times. If the cycle does not circulate for 30 times, the detection and tracking on the behavior is continued. If the cycle circulates for 30 times, the next Step is executed.

Step 204: Behavior characteristics are extracted.

Step 205: A first-level characteristic T1 is acquired.

The duration of stay at each point is ranked to obtain two positions where the user stays longer than other positions, it can be obtained that the position where the user stays longest is home, followed by company, or that the position where the user stays longest is company, followed by home. In this way, the first-level characteristic T1 is obtained.

Step 206: A second-level characteristic is acquired.

The second-level characteristic library of dynamic behaviors 'go to work' and 'come back home' is generated by using the stay duration at each position, past positions and other information.

Characteristic vectors K1 and K2 of the behaviors 'go to work' and 'come back home' are extracted. Each characteristic vector of each category of behavior may be imaged as a point in a multi-dimensional space, and a plurality of points of each category may be obtained from the collection carried out in a plurality of cycles. To represent the characteristics of each category truly, points corresponding to each category are averaged by using the following formula (1) to obtain the center of mass of the points. In this way, the characteristic vector value Ui of the two movement behaviors can be obtained.

$$u_i = \left(\sum_{j=1}^{n} Kij\right)/n, \quad (1)$$

$$i = 1, 2$$

Figure 3:
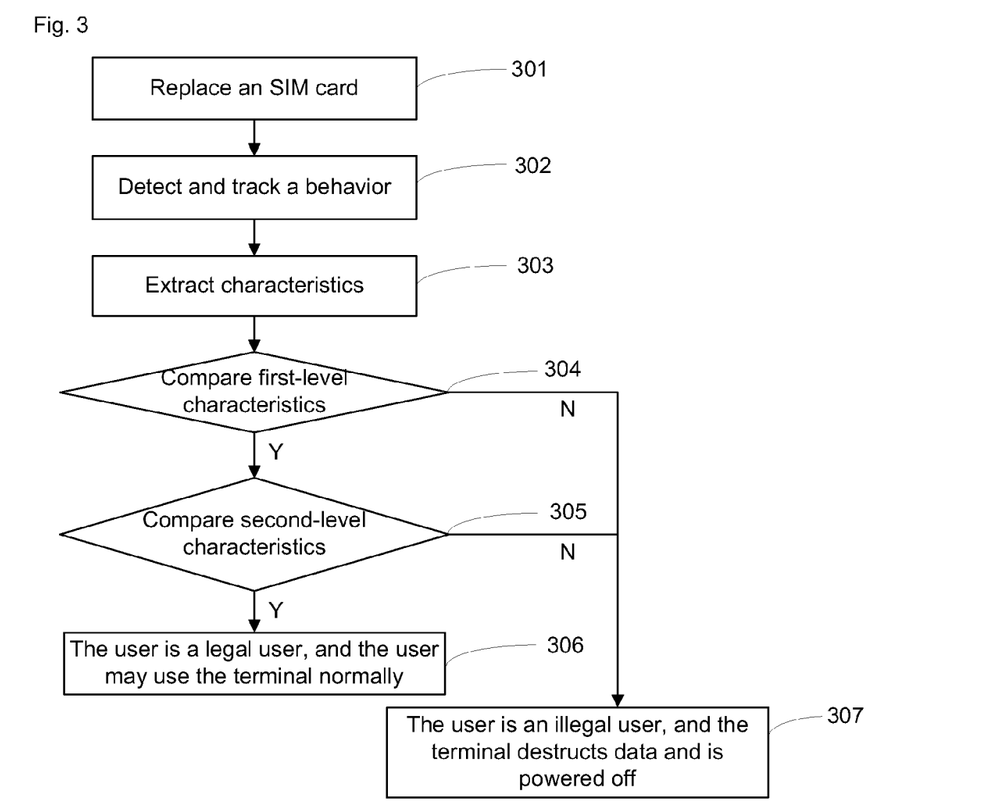
FIG. 3 illustrates a user identity recognition method according to an embodiment of the disclosure.

As shown in FIG. 3, a user identity recognition method according to an embodiment of the disclosure includes the following steps:

Step 301: An SIM card is replaced.

Step 302: A behavior is detected and tracked.

A movement behavior characteristic vector Kij of an operator is collected by calling a behavior detecting and tracking module.

Step 303: Characteristics are extracted.

Two position points the user stays longer a day, that is, a first-level characteristic T2, and the characteristic vector Si (i<=2) of two movement behaviors, are obtained by using the foregoing characteristic extraction method.

Step 304: The first-level characteristic values are compared. Step 305 is executed if T1 and T2 are same or similar, or Step 307 is executed if the first-level characteristic values are considerably different.

Distances between the home positions and the company positions in the first-level characteristic vector T2 and the extracted first-level characteristic T1 are determined. If the distance is smaller than a set threshold, then the two points are near and considered as one position point so as to ensure the matching of the address of the user with the original custom, and Step 305 is executed to carry out a further authentication. If the distance is not nearly close to the threshold, then Step 307 is executed.

Step 305: The second-level characteristics are compared. Step 306 is executed if the second-level characteristics are same or similar, or Step 307 is executed if the second-level characteristics are considerably different.

A nearest neighbor determination is performed on the collected characteristic vectors of the two movement behaviors and the two Ui vectors extracted in the training phase. The Euclidean distance in the following formula (2) is compared with a threshold. If the Euclidean distance is smaller than the threshold, it means that there is a near distance between two points and it is considered that the two points belong to the same characteristic, that is, the user is a legal user, and Step 306 is executed. If the Euclidean distance is greater than the threshold, the user is an illegal user, and Step 307 is executed.

$$\sqrt{((Si-ui)*(Si-ui))} \ i<2 \quad (2)$$

Step 306: It is determined that the user is a legal user, and the user may use the terminal normally.

Step 307: It is determined that the use is an illegal user.

After the current operator is proved to be an illegal user, various data of the former user are destructed to guarantee information security of the legal user, and the terminal sends a short messaging service message to the former telephone number of the legal user to inform the legal user of the number of the current operator, and is then powered off.

Figure 4:
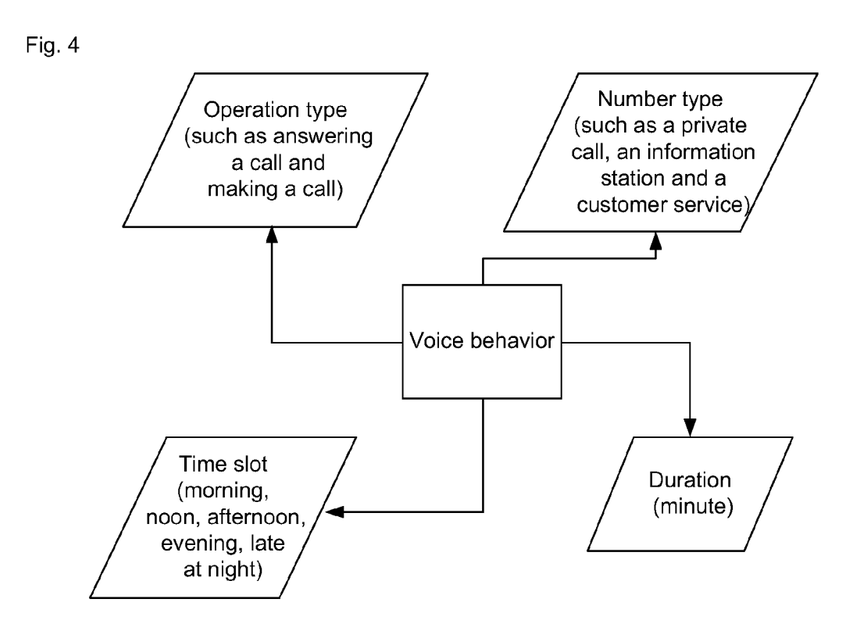
FIG. 4 is a user voice operation behavior recognition mode according to an embodiment of the disclosure.

FIG. 4 shows a user voice operation behavior recognition mode according to an embodiment of the disclosure.

A voice operation may correspond to four characteristics: an operation type (e.g., answering a call and making a call), a number type (e.g. a private call, an information station and a customer service), time slot (e.g., morning, noon, afternoon, evening and late at night) and duration, with which a functional behavior 'phone' may be recorded, for example, a behavior of answering a private call within a certain time slot, and duration of the private call are recorded.

An Internet access operation may correspond to four characteristics: an access mode (e.g., WIFI, GPRS, 3G), time slot, an online behavior (e.g., download, browsing webpage, chat or microblog) and duration, with which a functional behavior 'access the Internet' may be recorded, for example, a behavior that a user accesses, within a certain time slot, the Internet using WIFI to chat, and duration of accessing the Internet are recorded.

A short messaging service operation may correspond to three characteristics: an operation type (e.g., sending, receiving, replying, forwarding and deleting), a number type and time slot, with which a functional behavior 'messaging' may be recorded, for example, a behavior that a user sends a private short messaging service message within a certain time slot is recorded.

A telephone book operation may correspond to three characteristics: an operation type (e.g., adding, deleting, modifying), a number type and time slot, with which a functional behavior ' telephone book' may be recorded, for example, a behavior that a user adds a private telephone number within a certain time slot is recorded.

An STK operation may correspond to two characteristics: operation type (e.g., a short messaging service message, an SIM card and a USSD) and time slot, with which a functional behavior 'STK' may be recorded, for example, a behavior that a user uses a short messaging service message type of STK function within a given time slot is recorded.

A game operation may correspond to three characteristics: a category type (e.g., a stand-alone version and an online version), time slot and duration, with which a functional behavior 'game' may be recorded, for example, a behavior that a user plays a stand-alone game for a certain time within a given time slot is recorded.

A player operation may correspond to four characteristics: an operation type (e.g., playing and videorecording), a multimedia type (e.g., audio and video), segment and duration, with which a functional behavior 'game' may be recorded, for example, a behavior that a user plays a video for a certain time within a given time slot is recorded.

A camera operation may correspond to three characteristics: an operation type (e.g., taking photos and recording), time slot and duration, with which a functional behavior 'camera' can be recorded, for example, a behavior that a user takes photos for a certain time within a certain time slot is recorded.

An electronic reading operation may correspond to three characteristics: a read type (e.g., literature, science and education, and detective), time slot and duration, with which a functional behavior 'electronic reading' may be recorded, for example, a behavior that a user reads an electronic literature book for a certain time within a certain time slot is recorded.

A charging operation may correspond to three characteristics: an operation type (e.g., charging when a terminal is powered off and charging when the terminal is powered on), time slot and duration, with which a charging behavior may be recorded, for example, a behavior that the terminal of a user is charged for a certain time within a certain time slot when powered off is recorded.

To record operation behaviors of a user truly, the period from the moment a terminal inserted with an SIM is powered on to the moment the terminal is charged is taken as a cycle, so that the behavior habits of the user may be basically recorded by counting up behaviors of the user in several cycles.

A functional behavior 'voice' has four attributes: an operation type (e.g., answering a call and making a call), a number type (e.g., a private call, an information station and a customer service), time slot (e.g., morning, noon, afternoon, evening and late at night) and duration. Each attribute is digitally coded according to a set of values of the attribute. For example, for the operation type which has only two values, codes 1 and 2 may be set to represent 'answering a call' and 'making a call' respectively, and 0 may be set to represent a standby state; codes 1, 2 and 3 may be set for the number type which has three values; codes 1, 2, 3, 4 and 5 may be set for the five values of time slot. Since one day has 24 hours, the time slot may be divided into: morning: 8:00-12:00, noon: 12:00-14:00, afternoon: 14:00-18:00, evening: 18:00-23:00; and late at night: 23:00-8:00 of next morning, which is conformity with living habits of a person. The duration is timed with a real number in minutes. In this way, a behavior may be recorded with a series of digital codes. For example, the behavior that a user answers a private call for one minute in the morning may be represented with a coded vector (1, 1, 1, 1).

Other functional behaviors may also be represented in the aforementioned similar way.

Figure 5:
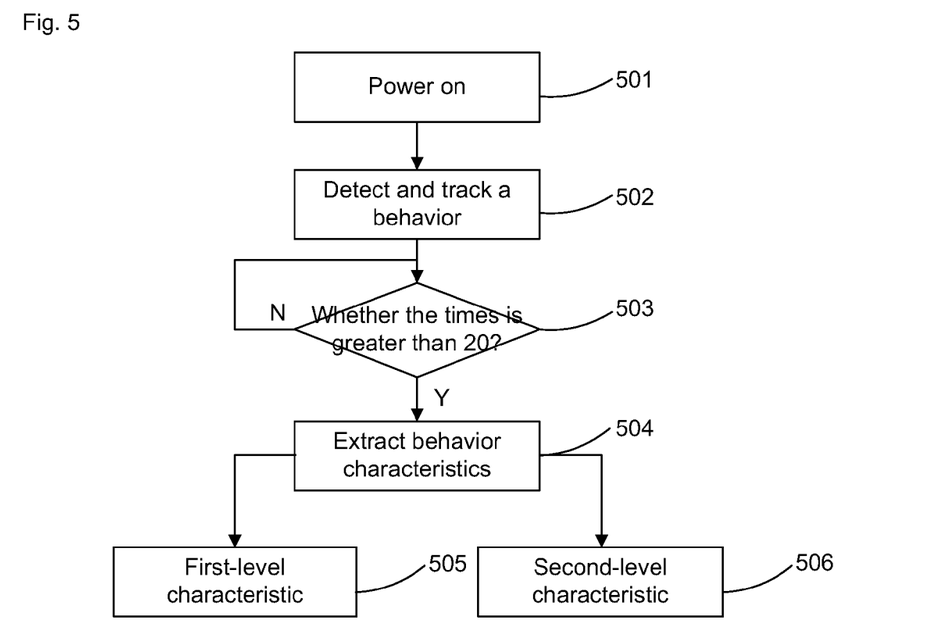
FIG. 5 is a user charging operation behavior recognition mode according to an embodiment of the disclosure.

As shown in FIG. 5, according to a user charging operation extraction mode provided in an embodiment of the disclosure, user identity characteristics are extracted through the following steps:

Step 501: A terminal is powered on.

Step 502: A behavior is detected and tracked.

A behavior detecting and tracking module starts running after the terminal is powered on. A functional module number vector K (0,0, 0,0) is initialized. There are m functional module number vectors, each position in which represents a corresponding functional function. The IMSI of the initially inserted SIM card is recorded.

If a certain function is used, then a corresponding module component value in the vector K is added by 1 and each functional behavior of the user is coded in the way described with reference to FIG. 1. There are m functions and 20 cycles are collected. A functional behavior i may not be used or used more than once in one cycle, and it is assumed the function behavior i is totally used for n (1<n<20 or n>20) times. Thus, there are coded vectors Ki1, Ki2, . . . Kin for the functional behavior i, wherein the value of k ranges from 1 to m.

Step 503: It is determined whether charging times is greater than 20 times. If charging times is greater than 20 times, Step 504 is executed. If charging times is not greater than 20 times, the determination continues to be performed.

To collect the use habit of the user, the period starting from the moment the terminal is powered on to the moment the power of the terminal is running out is taken as a cycle, and it is determined whether the cycle circulates for 20 times. If the cycle does not circulate for 20 times, the detection and tracking on the behavior is continued. If the cycle circulates for 20 times, the next Step is executed.

Step 504: Behavior characteristics are extracted.

The behavior characteristics are extracted by calling a behavior characteristic extraction module.

Step 505: The first-level characteristic number of frequently used functions is generated.

Step 506: The second-level characteristic library of each frequently used function attribute is generated.

The frequency at which each function is used is obtained by dividing the vector K by 20. A function which is used at a frequency of greater than or equal to 1 (the use times n of the functional behavior is greater than or equal to 20) is recorded as a frequently used function. A function used at a frequency of smaller than 1 is set to 0 to represent an infrequently used function. The number of frequently used functions is taken as a first-level characteristic number T1.

All coded vectors Kij (1<=i<=m, j>=20) of the infrequently used functions which are used at a frequency of smaller than 1 are discarded, and a group of characteristic vectors of Z first-level frequently used functions can be obtained according to the collected functional coded vectors. For each category of characteristic vectors, each characteristic vector may be imaged as a point in a multi-dimensional space, and a plurality of points of each category may be obtained from the collection carried out in a plurality of cycles. To represent the characteristics of each category truly, points corresponding to each category are averaged by using the following formula (3) to obtain the center of mass of the points. In this way, the characteristic vector value Ui of the Z frequently used functions can be obtained.

$$u_i = \left(\sum_{j=1}^{n} Kij\right)/n, \quad (3)$$

$$1 <= i <= Z$$

Figure 6:
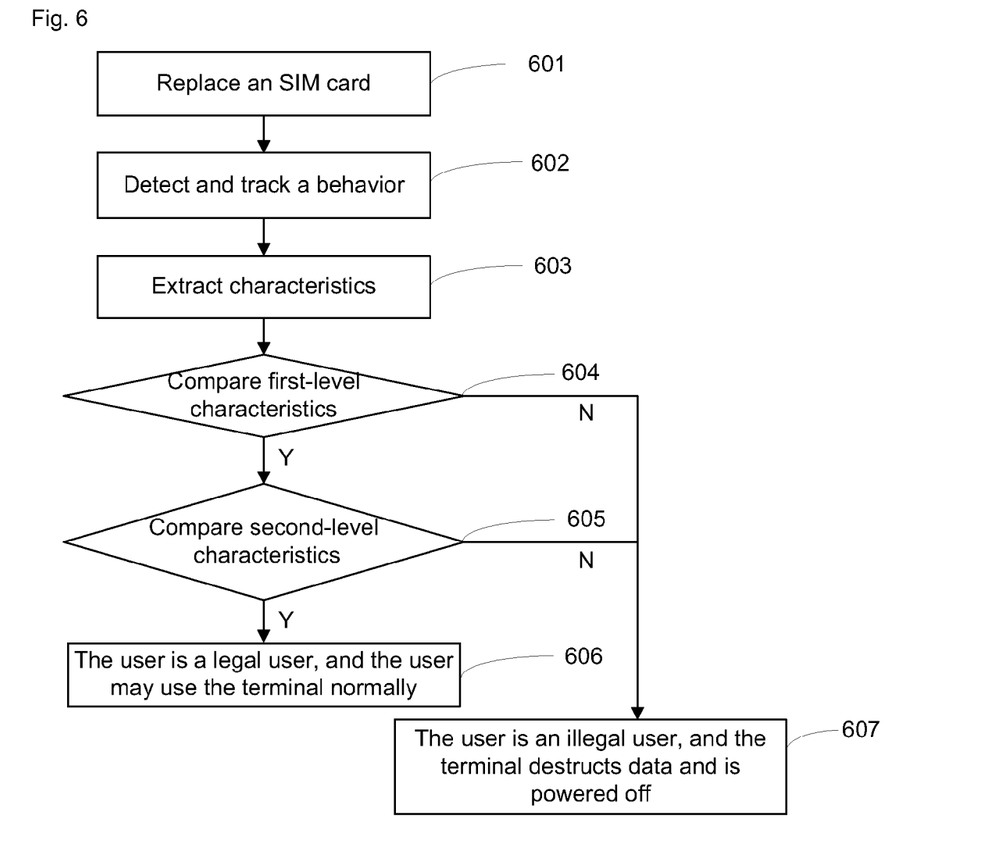
FIG. 6 illustrates another user identity recognition method according to an embodiment of the disclosure.

Please refer to FIG. 6. As shown in FIG. 6, another user identity recognition method according to an embodiment of the disclosure includes the following steps:

Step 601: An SIM card is replaced.

Step 602: A behavior is detected and tracked.

A movement behavior characteristic vector Kij of an operator is collected by calling a behavior detecting and tracking module;

Step 603: Characteristics are extracted.

The characteristic number T2 of functions frequently used in a cycle and characteristic vectors Si (i<=Z) of the Z frequently used functions are obtained by using the foregoing characteristic extraction method.

Step 604: The first-level characteristic values are compared. Step 605 is executed if T1 and T2 are same or similar, or Step 607 is executed if the first-level characteristic values are considerably different.

It is determined that an And operation is performed on the characteristic number T2 of frequently used functions and the extracted first-level characteristic number T1, and it is determined whether the result of the And operation is equal to T1, thereby ensuring functions frequently used in a validation phase include all functions frequently used in an authentication phase, and Step 605 is executed to carry out a validation operation again. If the result of the And operation is not equal to T1, Step 607 is executed.

Step 605: The second-level characteristics are compared. Step 605 is executed if the second-level characteristics are same or similar, or Step 607 is executed if the second-level characteristics are considerably different.

A nearest neighbor determination is performed on the characteristic vectors of the collected Z frequently used functions and the Z Ui vectors extracted in the training phase. The Euclidean distance in the following formula (4) is compared with a threshold. If the Euclidean distance is smaller than the threshold, it means that there is a near distance between two points, and it is considered that the two points belong to the same function, that is, the user is a legal user, and Step 606 is executed. If the Euclidean distance is greater than the threshold, the user is an illegal user, and Step 607 is executed.

$$\sqrt{((Si-ui)*(Si-ui))} \, i<=Z \quad (4)$$

Step 606: It is determined that the user is a legal user and the user may use the terminal normally.

Step 607: determine the current operator as an illegal user.

To guarantee information security of the legal user, various data of the former user are destructed, and the terminal sends a short messaging service message to the former telephone number of the legal user to inform the legal user of the number of the current operator, and is then powered off.

Figure 7:
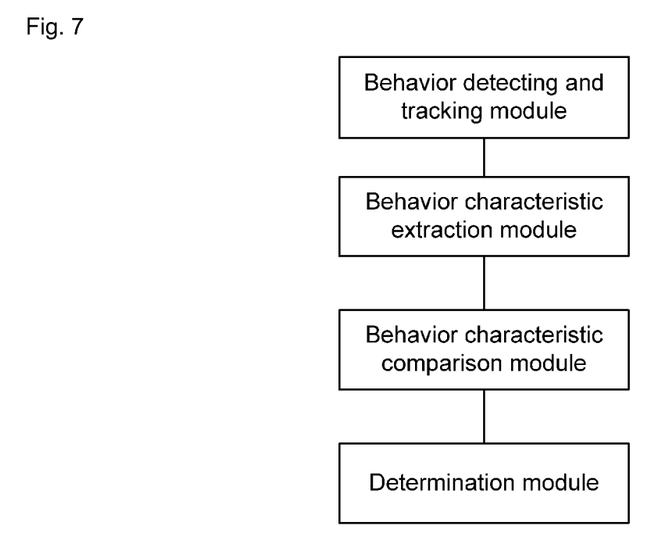
FIG. 7 is a schematic diagram illustrating the structure of a mobile terminal according to an embodiment of the disclosure.

Refer to FIG. 7, a mobile terminal according to an embodiment of the disclosure includes a behavior detecting and tracking module, a behavior characteristic extraction module, a behavior characteristic comparison module and a determination module.

The behavior detecting and tracking module is configured to detect and track a user's behavior before and after an SIM card is replaced, to provide data for extraction of behavior characteristics.

The behavior characteristic extraction module is configured to extract characteristics of the user's behavior before and after the SIM card is replaced.

The user characteristic comparison module is configured to compare the characteristics of the user's behavior before the SIM card is replaced with the characteristics of the user's behavior after the SIM card is replaced.

The determination module is configured to determine, according to the comparison result transmitted from the user characteristic comparison module, whether the user is a legal user, when the characteristics of the user's behavior before the SIM card is replaced are same as or similar to the characteristics of the user's behavior after the SIM card is replaced, determine that the user is a legal user, and when the characteristics of the user's behavior before the SIM card is replaced are not same as or similar to the characteristics of the user's behavior after the SIM card is replaced, determine that the user is an illegal user.

Apparently, the disclosure may also be implemented in many other forms and a variety of corresponding modifications or variations may be made by those skilled in the art. However, it should be appreciated that any modification, equivalent substitute or modification made without departing from the spirit and principle of the disclosure should fall within the scope of protection of the claims of the disclosure.

The invention claimed is:

1. A user identity recognition method for a mobile terminal, comprising:

detecting, by a mobile terminal, and tracking a user's behavior before a Subscriber Identity Module (SIM) card is replaced, and extracting characteristics of the user's behavior from the detected and tracked user's behavior;

after the SIM card is replaced, detecting and tracking a user's behavior and extracting characteristics of the user's behavior; and determining whether the characteristics of the user's behavior before the SIM card is replaced are same as or similar to the characteristics of the user's behavior after the SIM card is replaced; when the characteristics of the user's behavior before the SIM card is replaced are same as or similar to the characteristics of the user's behavior after the SIM card is replaced, determining that the user is a legal user; and when the characteristics of the user's behavior before the SIM card is replaced are not same as or similar to the characteristics of the user's behavior after the SIM card is replaced, determining that the user is an illegal user, wherein the characteristics of the user's behaviour comprises a first-level determination characteristic for roughly recording identity characteristics of the user and a two-level determination characteristic for precisely describing the identity characteristics of the user, wherein the user's behavior comprises a movement behavior and an operation behavior, wherein user's behavior characteristics of the movement behavior comprise home position information, company position information, home-company distance information, information of the user's commute time slot, and information of the user's commuting time to work, and wherein the operation behavior is one of the following: a voice operation, an Internet access operation, a short messaging service operation, a telephone book operation, an STK operation, a game operation, a player operation, a camera operation, an electronic reading operation and a charging operation.

2. The method according to claim 1, wherein when the operation behavior is the voice operation, characteristics corresponding to the user's behavior comprise an operation type, a number type, time slot and duration; when the operation behavior is the short messaging service operation, characteristics corresponding to the user's behavior comprise an operation type, a number type and time slot; when the operation behavior is the Internet access operation, characteristics corresponding to the user's behavior comprise an access mode, time slot, online behavior and duration; when the operation behavior is the telephone book operation, characteristics corresponding to the users behavior comprise an operation type, a number type and time slot; when the operation behavior is the STK operation, characteristics corresponding to the user's behavior comprise an operation type and time slot; when the operation behavior is the game operation, characteristics corresponding to the user's behavior comprise an operation type, time slot and duration; when the operation behavior is the player operation, characteristics corresponding to the user's behavior comprise an operation type, a multimedia type, time slot and duration; when the operation behavior is the camera operation, characteristics corresponding to the user's behavior comprise an operation type, time slot and duration; when the operation behavior is the electronic reading operation, characteristics corresponding to the user's behavior comprise an operation type, time slot and duration; and when the operation behavior is the charging operation, characteristics corresponding to the user's behavior comprise an operation type, time slot and duration.

3. A mobile terminal, comprising: a behavior detecting and tracking module, a behavior characteristic extraction module, a behavior characteristic comparison module and a determination module, wherein the behavior detecting and tracking module is configured to detect and track a user's behavior before and after a Subscriber Identity Module (SIM) card is replaced, to provide data for extraction of behavior characteristics;

the behavior characteristic extraction module is configured to extract characteristics of the user's behavior from the detected and tracked user's behavior before and after the SIM card is replaced;

the user characteristic comparison module is configured to compare the characteristics of the user's behavior before the SIM card is replaced with the characteristics of the user's behavior after the SIM card is replaced; and the determination module is configured to determine, according to the comparison result transmitted from the user characteristic comparison module, whether the user is a legal user, when the characteristics of the user's behavior before the SIM card is replaced are same as or similar to the characteristics of the user's behavior after the SIM card is replaced, determine that the user is a legal user, and when the characteristics of the user's behavior before the SIM card is replaced are not same as or similar to the characteristics of the user's behavior after the SIM card is replaced, determine that the user is an illegal user, wherein the characteristics of the user's behaviour comprises a first-level determination characteristic for roughly recording identity characteristics of the user and a two-level determination characteristic for precisely describing the identity characteristics of the user, wherein the user's behavior comprises a movement behavior and an operation behavior, wherein user's behavior characteristics of the movement behavior comprise home position information, company position information, home-company distance information, information of the user's commute time slot, and information of the user's commuting time to work, and wherein the operation behavior is one of the following: a voice operation, an Internet access operation, a short messaging service operation, a telephone book operation, an STK operation, a game operation, a player operation, a camera operation, an electronic reading operation and a charging operation.

4. The mobile terminal according to claim 3, wherein when the operation behavior is the voice operation, characteristics corresponding to the user's behavior comprise an operation type, a number type, time slot and duration; when the operation behavior is the short messaging service operation, characteristics corresponding to the user's behavior comprise an operation type, a number type and time slot; when the operation behavior is the Internet access operation, characteristics corresponding to the user's behavior comprise an access mode, time slot, online behavior and duration; when the operation behavior is the telephone book operation, characteristics corresponding to the user's behavior comprise an operation type, a number type and time slot; when the operation behavior is the STK operation, characteristics corresponding to the user's behavior comprise an operation type and time slot; when the operation behavior is the game operation, characteristics corresponding to the user's behavior comprise an operation type, time slot and duration; when the operation behavior is the player operation, characteristics corresponding to the user's behavior comprise an operation type, a multimedia type, time slot and duration; when the operation behavior is the camera operation, characteristics corresponding to the user's behavior comprise an operation type, time slot and duration; when the operation behavior is the electronic reading operation, characteristics corresponding to the user's behavior comprise an operation type, time slot and duration; and when the operation behavior is the charging operation, characteristics corresponding to the user's behavior comprise an operation type, time slot and duration.

\* \* \* \* \*